US008645339B2

(12) United States Patent
Kang et al.

(10) Patent No.: US 8,645,339 B2
(45) Date of Patent: Feb. 4, 2014

(54) METHOD AND SYSTEM FOR MANAGING AND QUERYING LARGE GRAPHS

(75) Inventors: U Kang, Pittsburgh, PA (US);
Ching-Yung Lin, Hawthorne, NY (US);
Jimeng Sun, Hawthorne, NY (US);
Hanghang Tong, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/294,598

(22) Filed: Nov. 11, 2011

(65) Prior Publication Data

US 2013/0124488 A1 May 16, 2013

(51) Int. Cl.
*G06F 17/30* (2006.01)
*G06F 15/16* (2006.01)

(52) U.S. Cl.
USPC .......................................... 707/693; 707/798

(58) Field of Classification Search
USPC ................................................. 707/693, 798
See application file for complete search history.

(56) References Cited

U.S. PATENT DOCUMENTS

| | | | | |
|---|---|---|---|---|
| 2005/0228811 | A1* | 10/2005 | Perry | 707/101 |
| 2006/0179051 | A1* | 8/2006 | Whitney et al. | 707/5 |
| 2009/0193044 | A1* | 7/2009 | Buehrer et al. | 707/101 |
| 2009/0259626 | A1* | 10/2009 | Parida | 707/3 |

OTHER PUBLICATIONS

Kang et al (PEGASUS: A Peta-Scale Graph Mining System—Implementation and Observations), Published in 2009, pp. 1-10.*
Kang et al (GBASE: A Scalable and General Graph Management System), Published Aug. 2011, pp. 1-9.*

* cited by examiner

*Primary Examiner* — Alex Gofman
(74) *Attorney, Agent, or Firm* — William J. Stock

(57) ABSTRACT

A method, system and computer program product for managing and querying a graph. The method includes the steps of: receiving a graph; partitioning the graph into homogeneous blocks; compressing the homogeneous blocks; and storing the compressed homogeneous blocks in files where at least one of the steps is carried out using a computer device.

18 Claims, 5 Drawing Sheets

$A = \begin{array}{|c|} \hline 0101 \\ 1010 \\ 0101 \\ 1010 \\ \hline \end{array}$ 201

→

$B = \begin{array}{|c|} \hline 1100 \\ 1100 \\ \hline 0011 \\ 0011 \\ \hline \end{array}$ 202, 203, 204, 205, 206

FIGURE 2

METHOD AND SYSTEM FOR MANAGING AND QUERYING LARGE GRAPHS

SUBJECT INVENTION UNDER GOVERNMENT CONTRACT

This invention was made with Government support under W911NF-09-2-0053 awarded by Army Research Office. The Government has certain rights to this invention.

BACKGROUND OF THE INVENTION

The present invention relates to mathematical graph applications; more specifically, a technique for solving both global and targeted queries for large graphs with billions of nodes and edges.

Today, mathematical graphs appear in numerous applications including cyber-security, social networks, protein networks and recommendation systems. Often, these mathematical graphs contain millions or billions of nodes and edges. Storing and querying these large mathematical graphs are problematic due to their sheer size.

As a result, a scalable and efficient method for storing and querying these large graphs is needed.

SUMMARY OF THE INVENTION

One aspect of the present invention provides a method of managing and querying a graph. The method includes the steps of: receiving a graph; partitioning the graph into homogeneous blocks; compressing the homogeneous blocks; and storing the compressed homogeneous blocks in files where at least one of the steps is carried out using a computer device.

Another aspect of the present invention provides a system for managing and querying a graph. The system includes a receiving module adapted to receive a graph; a partitioning module adapted to partition the graph into homogeneous blocks; a compressing module adapted to compress the homogeneous blocks; and a storing module adapted to store the compressed homogeneous blocks in files.

Another aspect of the present invention provides a computer readable storage medium tangibly embodying a computer readable program code having computer readable instructions which when implemented, cause a computer to carry out the steps of: receiving a graph; partitioning the graph into homogeneous blocks; compressing the homogeneous blocks; and storing the compressed homogeneous blocks in files where at least one of the steps is carried out using a computer device.

BRIEF DESCRIPTION OF THE DRAWINGS

FIG. 2 shows an example of clustering a graph into homogeneous blocks according to an embodiment of the present invention.

DETAILED DESCRIPTION OF THE PREFERRED EMBODIMENTS

Figure 1:
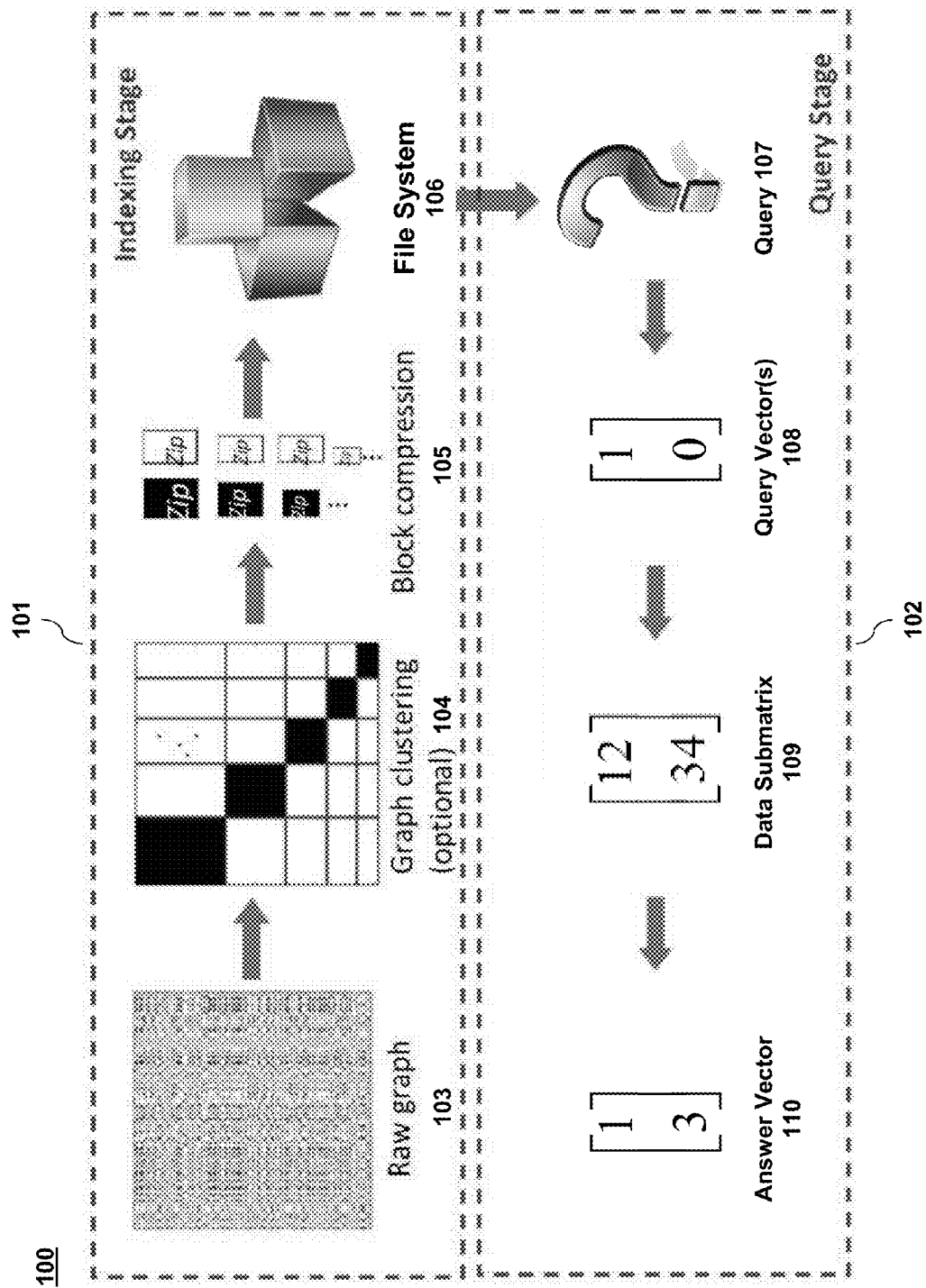
FIG. 1 shows a flowchart of a method for managing and querying a graph according to an embodiment of the present invention.

Graphs have been receiving increasing research attention, since they are applicable in a wide variety of high impact applications such as social networks, cyber-security, recommendation systems, fraud/anomaly detection, and protein-protein interaction networks. In fact, any many-to-many database relationship can be easily treated as a graph, with myriads of additional applications (patients and symptoms; customers and locations they have been to; documents and terms in IR, etc). To add to the challenge of graph mining, even the volume of such graphs is unprecedented, reaching and exceeding billions of nodes and edges.

A goal of the present invention is to build a general graph management system designed to work in a parallel, distributed system which can support graphs with billions of nodes and edges for various applications. In order to accomplish this, two problems need to be addressed:

(1) Storage: How to store and manage these large mathematical graphs in order to answer queries efficiently? How to split the edges in order to accomplish this? How to group the units into files?

(2) Query Optimization: How to exploit the efficient storage and general algorithms to execute queries efficiently? How to define common, core algorithms to satisfy various graph applications?

As previously mentioned, scalability is one of the major challenges since the size of graphs has been experiencing unprecedented growth. For example, a web graph from Yahoo had more than 1 billion nodes and almost 7 billion edges in 2002. Twitter has a graph which spans several Terabytes. Click-stream graphs are reported to reach a Petabyte scale. Such large graphs can not be stored in a single workstation's main memory or disk. To further complicate this problem, most of the existing graph algorithms have been built to run on a single workstation. Thus, a goal of the present invention is to enable these algorithms to run on graphs that span Terabytes of data and beyond.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following is a legend defining the various symbols used throughout this specification:

| Symbol | Definition |
| --- | --- |
| G | Graph. |
| k, l | Number of source (destination) partitions. |
| p, q | Partition indices, $1 \leq p \leq k$, $1 \leq q \leq l$. |
| $I^{(p)}$ | Set of sources belonging to the p-th partition. |
| $J^{(q)}$ | Similar to $I^{(p)}$, but for destination nodes. |
| $l^{(p)}$ | Source partition size, $l^{(p)} = |I^{(p)}|$, $1 \leq p \leq l$. |
| $G^{(p,q)}$ | Subgraphs induced by p = th and q-th partitions. |
| H(.) | Shannon entropy function. |

FIG. 1 is a flowchart illustrating a method 100 of managing and querying a graph according to an embodiment of the present invention. The method includes two main stages: (i) indexing 101 and (ii) querying 102.

Indexing Stage (101)

The indexing stage 101 includes 4 main steps, 103-106. In step 103, a raw graph is received according to this embodiment of the present invention. If the received graph is not in sparse adjacency matrix format, the graph can be converted into sparse adjacency matrix format in order to facilitate the indexing of the graph. The sparse adjacency matrix format stores each edge using a source-destination pair. Other formats such as the adjacency list format are simple and useful for answering out-neighbor queries. However, these formats are not efficient for answering general queries such as in-neighbor queries and ego-net queries. The generality and flexibility of the sparse adjacency matrix format enables several efficient storage and indexing techniques.

In step 104, (i) the source-destination pairs of the graph are optionally clustered into sparse or dense homogeneous blocks and (ii) the graph is partitioned into subgraphs containing the homogeneous blocks according to an embodiment of the present invention. These homogeneous blocks can be more dense or sparse than the original, received raw graph. In order to cluster the source-destination pairs, the rows and columns of the graph are reordered to make homogeneous regions (i.e. sparse or dense subgraphs) into homogeneous blocks. Partitioning algorithms form an active research area, and finding optimal partitions is orthogonal to the present invention. Any partitioning algorithms such as METIS or Distributed Co-Clustering (DisCo) can be used by this embodiment of the present invention to cluster the graph's source-destination pairs. After the source-destination pairs are clustered, the graph is partitioned into subgraphs which contain sparse or dense homogeneous blocks. It should be noted that these homogeneous blocks can be of uniform size.

For example, given a raw graph G, the nodes can be partitioned into k groups. The set of nodes that are assigned into the p-th partition for $1 \leq p \leq k$ is denoted by $I^{(p)}$. The subgraph or block induced by p-th source partition $I^{(p)}$ and q-th destination partition $J^{(q)}$ is denoted as $G^{(p,q)}$. The sets $I^{(p)}$ partition the nodes, in the sense that $I^{(p)} \cap I^{(p')} = \emptyset$ for $p \neq p'$, while $U_p I^{(p)} = \{1, \ldots, n\}$. Similarly, the sets $J^{(q)}$ partition the destination nodes.

In terms of storage, one objective is to find the optimal k partitions which lead to smallest total storage cost of all blocks/subgraphs $G^{(p,q)}$ where $1 \leq p, q \leq k$. The induced subgraphs should be homogeneous according to an embodiment of the present invention. In other words, the subgraphs are either very dense or very sparse compared to the original raw graph. This captures not only community structure but also leads to a smaller storage cost.

For many real graphs, the community/clustering structure can be naturally identified. For example, in Web graphs, the lexicographic ordering of the URL can be used as an indicator of community since there are usually more intra-domain links than inter-domain links. For authorship network, the research interest is often a good indicator to find communities since authors with the same or similar research interest tend to collaborate more. For a patient-doctor graph, the patient information (e.g., geography, disease type, etc) can be used to find the communities of patients with similar diseases and living in the same neighborhood which have a higher chance of visiting the same doctor.

FIG. 2 shows an example of step 104 according to an embodiment of the present invention. 201 represents the graph in sparse adjacency matrix format before any clustering occurs. 202 represents the graph after its source-destination pairs have been clustered into homogeneous blocks 203-206. Since homogeneous blocks 203 and 206 consist of 1's, they are dense homogeneous blocks. Since homogeneous blocks 204 and 205 consist of 0's, they are sparse homogeneous blocks. As previously mentioned, there are many algorithms which exist today which can accomplish optional step 104. Once this is done, the graph is partitioned into subgraphs which contain the homogeneous blocks. More specifically, one embodiment of the present invention would partition graph 202 into four subgraphs, each subgraph containing one of the homogeneous blocks 203-206 respectively.

At this point, metadata can be created to assist with the query stage of the method. Metadata can include the block row/column ids for each homogeneous block according to an embodiment of the present invention. For example, the following metadata can be created for homogeneous blocks 203, 204, 205 and 206:

Homogeneous block 203: block row id=1; block column id=1

Homogeneous block 204: block row id=1; block column id=2

Homogeneous block 205: block row id=2; block column id=1

Homogeneous block 206: block row id=2; block column id=2

Using this metadata, the query stage can refer to block row id=2; block column id=1; node id=(2, 2) to refer to the bottom right zero in homogeneous block 205.

In step 105, the homogeneous blocks which are formed in step 104 are compressed according to an embodiment of the present invention. There are many methods of compression which can be used to compress the homogeneous blocks such as naïve and zip block encoding. Naïve encoding is raw block encoding which only stores the coordinates of the non-zero entries in the block. Although this method saves the storage space since the nonzero elements within the block can be encoded with a smaller number of bits (log (max ($I^{(p)}$, $n^{(q)}$)) than the original, the savings are not great as with zip encoding.

In order to achieve better compression, zip block encoding can be used which converts the adjacency matrix of the subgraph into a binary string and stores the compressed string as the payload. Compared to raw block encoding, zip block encoding requires more cpu time to zip and unzip blocks. However, zip encoding provides storage savings and reduced data transfer size which improves the performance. For example, the following adjacency matrix of a graph is given:

$$G = \begin{bmatrix} 100 \\ 100 \\ 011 \end{bmatrix}$$

Naïve block encoding stores the non-zero coordinates (0, 0), (1, 0), (2, 1), and (2, 2) as the payload. Zip block encoding converts the matrix into a binary string 110, 001, 001 (in the column major order) and then uses the compression of this string as the payload. The storage needed for naïve block encoding is proportional to the number of edges in that block $O(m^{(p,q)})$ while the storage needed for zip block encoding is $I^{(p)} n^{(q)} H(d)$, where d is the density of $G^{(p,q)}$, in other words:

$$d = \frac{m^{(p,q)}}{I^{(p)} n^{(q)}}$$

Note that H(·) is the following Shannon entropy function:

$$H(X) = \sum_x p(x) \log p(x)$$

where p(x) is the probability that X=x. Note that the number of bits required to encode an edge using zip block encoding decreases as d increases, while it is constant in naïve block encoding.

In step 106, the homogeneous blocks are stored in a file system such as HDFS of HADOOP or a relational database. The main idea is to place one or more homogeneous blocks together into a file, and select only relevant files as inputs during for the query stage 102. A typical way to place blocks in a file is to use vertical placement to place the vertical blocks in a file as shown by 301 in FIG. 3. Another alternative is to use horizontal placement to place the horizontal blocks in a file as shown by 302 in FIG. 3. However, these placement techniques are not efficient for all types of queries. For example, horizontal and vertical placement are only efficient for out-neighbor and in-neighbor queries, respectively. However, vertical placement is not efficient for out-neighbor queries, and horizontal placement is not efficient for in-neighbor queries.

Figure 3:
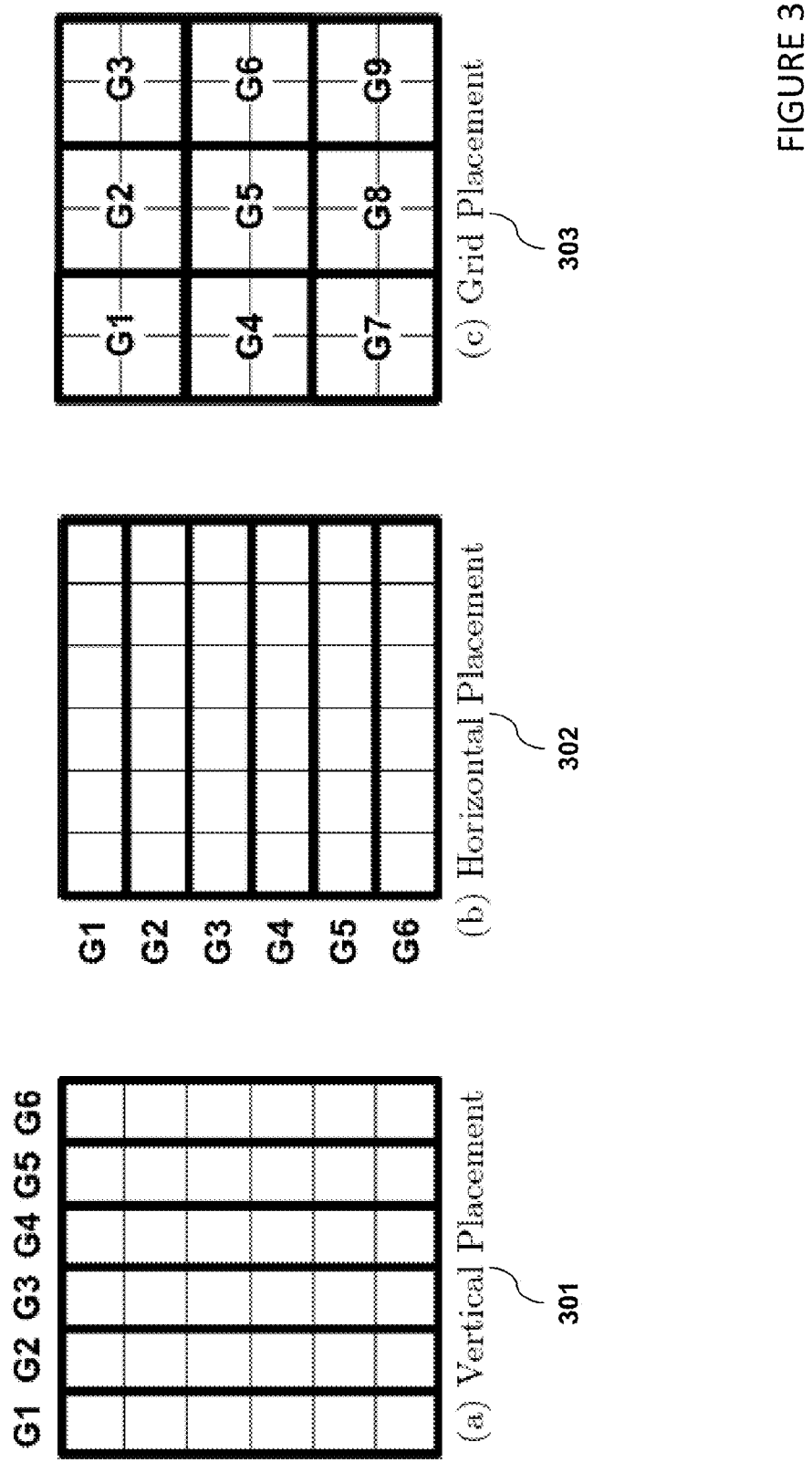
FIG. 3 shows examples of vertical placement, horizontal placement and grid placement of homogeneous blocks within a file system according to an embodiment of the present invention.

In order to provide a more flexible framework which is efficient for all types of queries, grid placement can be used as shown by 303 in FIG. 3 according to an embodiment of the present invention. The advantage of the grid placement is that it can answer various types of queries efficiently. Suppose all the compressed blocks are stored in K files. With vertical/horizontal placement, O(K) file accesses are required to find the in- and out-neighbors of a given query node. In contrast, grid placement only requires $O(\sqrt{K})$ accesses. Therefore, grid placement requires less data from fewer files to answer a wider variety of query types. However, it should be noted that the present invention can utilize horizontal, vertical or grid placement.

Query Stage (102)

The query stage 102 includes four main steps 107-110. In step 107, a query is received. This query can be any query, global or targeted, which is asked of the graph such as diameter estimation, connected component, PageRank, random walk, induced subgraph, k-neighbor, k-egonet and cross edge queries.

In step 108, a query vector is created using the query. For example, for a 1-step in-neighbor query, the following query vector can be created where the "1" denotes the query node in the graph according to an embodiment of the present invention:

$$\begin{bmatrix} 0 \\ 1 \\ 0 \end{bmatrix}$$

The query node denotes the node where the 1-step in-neighbors are to be found from. The example given above is known as an indicator vector which is useful for certain queries. Indicator vectors have a single non-zero value of 1 as shown above, with all other values equal to zero. It should be noted that the query vector can look different depending on the query. For example, there could be several non-zero values within the query vector, and the non-zero values can be any non-zero number.

In step 109, a data submatrix is created, according to an embodiment of the present invention, by (i) determining which of the files created in step 106 contain information relevant to the query and (ii) decompressing the relevant files.

Determining the relevant files of the file system can be done in a number of ways according to an embodiment of the present invention. For example, this determination can be based on the query type. If the query type is a global query such as graph diameter estimation, then all of the data on the graph determined to be relevant to the query. If the query type is a targeted query such as a 1-step in-neighbor query, then only the file or files which contain the homogeneous blocks encompassing the data on the query node and the query node's 1-step in-neighbors are determined to be relevant.

The relevant files within the file system contain the compressed homogeneous blocks which hold the information relevant to the query. These are the same compressed homogeneous blocks which were created in step 104 and compressed in step 105. Once the relevant file or files are determined, the relevant files are decompressed. It should be noted that for some queries, such as out-neighbor queries, the data submatrix can be transposed in order to make the following steps easier and more efficient according to an embodiment of the present invention. Further, the data submatrix can be converted into an incidence matrix according to an embodiment of the present invention. Using the incidence matrix as the data submatrix can enable the present invention to solve certain queries such as an induced subgraph query.

In step 110, an answer vector is created by executing generalized iterated matrix vector multiplication (GIM-V) on (i) the query vector created in step 108 and (ii) the data submatrix created in step 109. GIM-V includes several functions which can be run on the query vector and the data submatrix. For example, according to an embodiment of the present invention, GIM-V can be a simple matrix-vector multiplication in which a simple summation is applied as shown in the following example:

$$\begin{bmatrix} 12 \\ 34 \end{bmatrix} \times \begin{bmatrix} 1 \\ 5 \end{bmatrix} = \begin{bmatrix} 11 \\ 23 \end{bmatrix}$$

Here, the answer vector can be a summation matrix-vector multiplication (1+10 and 3+20 respectively) which gives the resulting answer vector. In another embodiment of the present invention, a minimum function can be applied. In this case, instead of summing the result of the multiplication, we would take the minimum as follows:

$$\begin{bmatrix} 12 \\ 34 \end{bmatrix} \times \begin{bmatrix} 1 \\ 5 \end{bmatrix} = \begin{bmatrix} 1 \\ 3 \end{bmatrix}$$

Here, the answer vector includes the minimum value of the multiplication (1 is less than 10 and 3 is less than 20 respectively). There are many other functions within GIM-V which can be run against the data submatrix and query vector. For more details on GIM-V and its functions, please see the following reference which is incorporated herein by reference, Kang et al., "PEGASUS: A Peta-Scale Graph Mining System—Implementation and Observations", Proc. Intl. Conf. Data Mining, 2009, pp. 229-238.

It should be noted that GIM-V can be applied to the data submatrix and query vector using standard query language (SQL) according to an embodiment of the present invention. For example, the following SQL can be used to determine the 2-step in-neighbors using a table E which includes the source of an edge in the graph as one column and the destination of an edge in the graph as another column:

```
SELECT    E2.source
FROM      E as E1, E as E2
WHERE     E1.destination = 'q'
AND       E1.source = E2.destination
```

Finally, it should also be noted that the query stage 102 can be parallelized across multiple processors and/or machines according to an embodiment of the present invention. For example, in the case where more than one of the homogeneous blocks created in step 104 need to be processed to answer a query, each of the homogeneous blocks created in step 104 can be assigned to a different process, processor or machine. This means that the entire query stage 102 is run on a different instance of a process, processor or machine for each homogeneous block.

Figure 4:
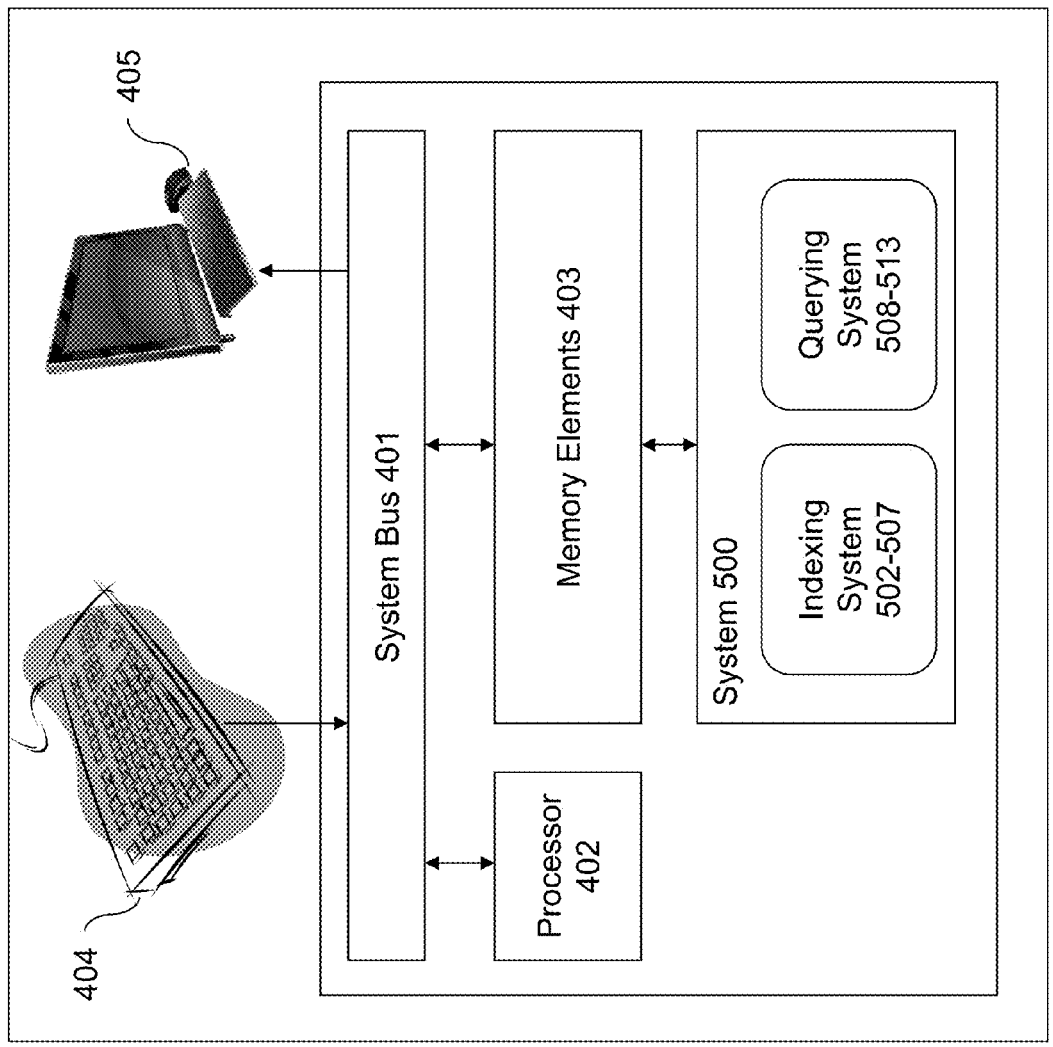
FIG. 4 shows a system for managing and querying a graph according to an embodiment of the present invention.

FIG. 4 is a block diagram of a system (hereinafter "system") 400 for managing and querying a graph in accordance with another embodiment of the present invention. The system 400 can include at least one processor 402 coupled to memory elements 403 through a system bus 401. As such, the system 400 can store program code within the memory elements 403. The processor 402 can execute the program code accessed from the memory elements 403 via the system bus 401. In one aspect, for example, the system 400 can be implemented as computer that is suitable for storing and/or executing program code. It should be appreciated, however, that the system 400 can be implemented in the form of any system comprising a processor and memory that is capable of performing the functions described within this specification.

The memory elements 403 can include one or more physical memory devices such as, for example, local memory (not shown) and one or more bulk storage devices (not shown). Local memory refers to random access memory or other non-persistent memory device(s) generally used during actual execution of the program code. Bulk storage device(s) can be implemented as a hard disk drive (HDD), solid state drive (SSD) or other persistent data storage device. The system 400 also can include one or more cache memories (not shown) that provide temporary storage of at least some program code in order to reduce the number of times program code must be retrieved from bulk storage device during execution.

Input/output (I/O) devices such as a keyboard 404, a display 405, and a pointing device (not shown) optionally can be coupled to the system 400. The I/O devices can be coupled to the system 400 either directly or through intervening I/O controllers. Network adapters also can be coupled to the system 400 to enable the system 400 to become coupled to other systems, computer systems, remote printers, and/or remote storage devices through intervening private or public networks. Modems, cable modems, and Ethernet cards are examples of different types of network adapters that can be used with the system 400.

As pictured in FIG. 4, the memory elements 403 can store the system 500, including the indexing system 502-507 and the querying system 508-513. The processor can execute the system 500 to implement the processes and methods described herein.

Figure 5:
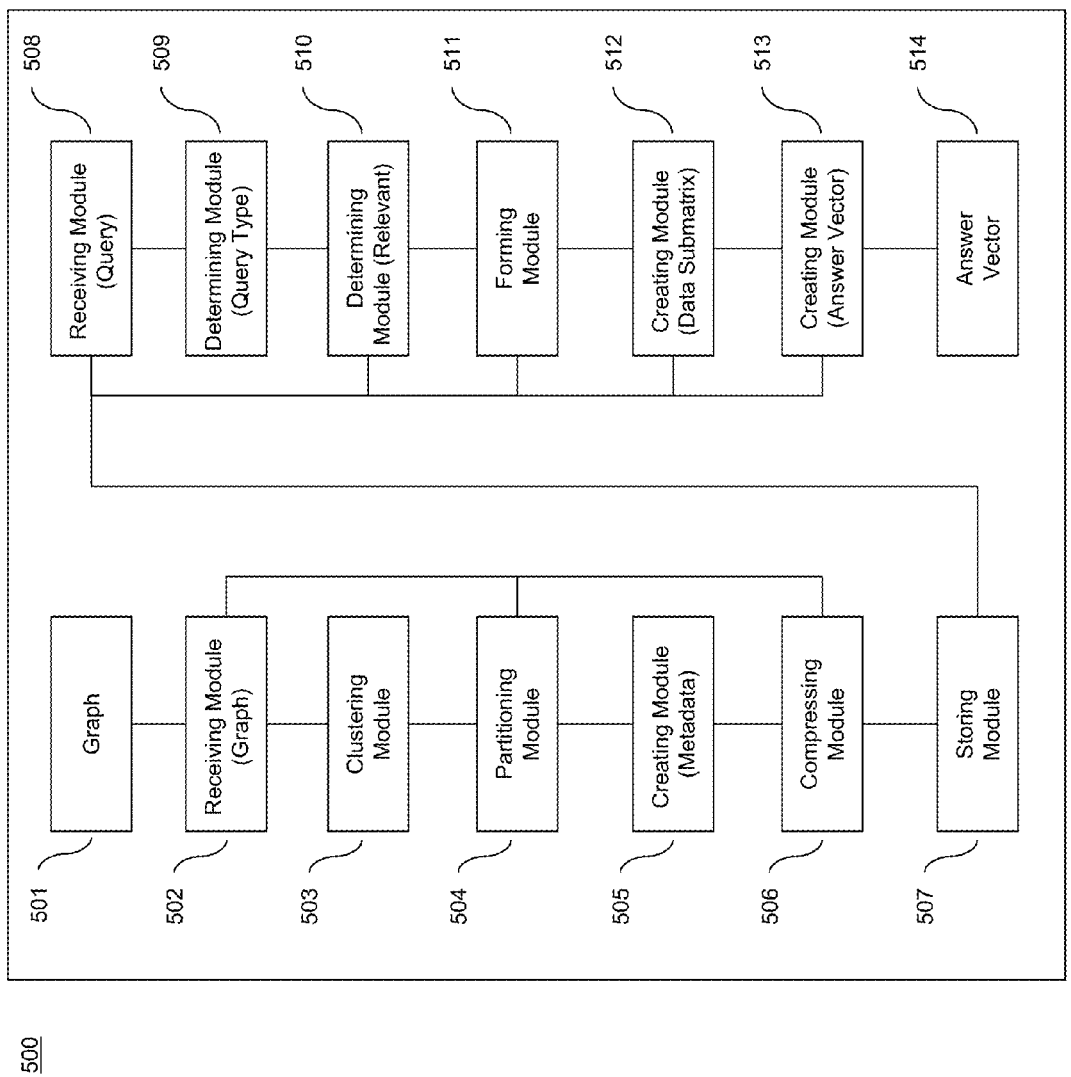
FIG. 5 shows a more detailed view of the system for managing and querying a graph according to an embodiment of the present invention.

FIG. 5 shows the system 500 for managing and querying a graph in more detail according to a preferred embodiment of the present invention. In the preferred embodiment shown in FIG. 5, system 500 can include the following modules 502-513 as well as a graph 501 and Answer Vector 514.

A receiving module 502 receives a raw graph 501 as discussed in step 103 of FIG. 1. In addition, if the received graph is not in sparse adjacency matrix format, the receiving module 502 can also convert the received graph into sparse adjacency matrix format in order to facilitate the indexing of the graph.

A clustering module 503 clusters the source-destination pairs of the graph into sparse or dense homogeneous blocks as discussed in step 104 of FIG. 1. A partitioning module 504 partitions the graph 501 into homogeneous blocks as discussed in step 104 of FIG. 1. A creating module 505 creates metadata for each homogeneous block as discussed in step 104 of FIG. 1. A compressing module 506 compresses the homogeneous blocks as discussed in step 105 of FIG. 1. A storing module 507 stores the homogeneous blocks in a file system as discussed in step 106 of FIG. 1.

A receiving module 508 receives a query as discussed in step 107 of FIG. 1. A determining module 509 determines the query type of the query as discussed in step 109 of FIG. 1. A determining module 510 determines the relevant files as discussed in step 109 of FIG. 1. A forming module 511 forms a query vector as discussed in step 108 of FIG. 1. A creating module 512 creates a data submatrix as discussed in step 109 of FIG. 1. A creating module 513 creates an answer vector 514 as discussed in step 110 of FIG. 1.

Like numbers have be used to refer to the same items throughout this specification. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of managing and querying a graph, said method comprising the steps of:
   receiving said graph;
   partitioning said graph into at least one homogeneous block;
   compressing said at least one homogeneous block;
   storing said compressed at least one homogeneous block in at least one file;
   wherein at least one of the steps is carried out using a computer device;
   receiving a query;
   forming at least one first query vector based on said query;
   determining at least one relevant file which contains information needed to answer said query;
   creating a first data submatrix by decompressing said at least one relevant file;

creating a first answer vector by executing generalized iterated matrix vector multiplication between said first data submatrix and said at least one first query vector;

creating a second data submatrix using said first answer vector;

creating at least one second query vector using said first answer vector; and creating a second answer vector by executing generalized matrix vector multiplication on between said second data submatrix and said at least one second query vector.

2. The method according to claim 1, further comprising the step of clustering a plurality of source-destination pairs of said graph into at least one subgraph which is more (i) sparsely or (ii) densely populated than said graph.

3. The method according to claim 2 wherein said clustering step uses a clustering algorithm.

4. The method according to claim 1, further comprising the step of creating metadata for said at least one homogeneous block.

5. The method according to claim 4 wherein said metadata associates said plurality of source-destination pairs with said at least one homogeneous block.

6. The method according to claim 1 wherein said compressing step uses (i) naïve block encoding or (ii) zip encoding.

7. The method according to claim 1 wherein said graph is in adjacency matrix format.

8. The method according to claim 1 wherein said storing step only stores said compressed at least one homogeneous block in at least one file if said compressed at least one homogeneous block contains at least one non-zero element.

9. The method according to claim 1 wherein said storing step stores said compressed at least one homogeneous block using grid placement.

10. The method according to claim 1, further comprising the steps of:

determining a query type based on said query;

wherein said determining step uses said query type to determine said at least one relevant file.

11. The method according to claim 1 wherein said at least one first query vector is an incidence vector based on said query.

12. The method according to claim 1, further comprising the step of transposing said first data submatrix.

13. The method according to claim 1, wherein said creating said first data submatrix step further comprises converting said decompressed at least one relevant file into an incidence matrix.

14. The method according to claim 1 wherein said creating said first answer vector step uses standard query language (SQL) to execute said generalized iterated matrix vector multiplication.

15. A system for managing and querying a graph, said system comprising:

at least one memory element storing the system;

at least one processor coupled to the memory element, wherein the processor executes the following modules of the system:

a first receiving module adapted to receive said graph;

a partitioning module adapted to partition said graph into at least one homogeneous block;

a compressing module adapted to compress said at least one homogeneous block;

a storing module adapted to store said compressed at least one homogeneous block in at least one file;

a second receiving module adapted to receive a query;

a forming module adapted to form at least one first query vector based on said query;

a determining module adapted to determine at least one relevant file which contains information needed to answer said query; and a creating module adapted to create:

a first data submatrix by decompressing said at least one relevant file;

a first answer vector by executing generalized iterated matrix vector multiplication between said first data submatrix and said at least one first query vector:

a second data submatrix using said first answer vector;

at least one second query vector using said first answer vector; and a second answer vector by executing generalized matrix vector multiplication on between said second data submatrix and said at least one second query vector.

16. The system according to claim 15, further comprising a clustering module adapted to cluster a plurality of source-destination pairs of said graph into at least one subgraph which is more (i) sparsely or (ii) densely populated than said graph.

17. The system according to claim 15, further comprising a creating module adapted to create metadata for said at least one homogeneous block.

18. A non-transitory computer readable storage medium tangibly embodying a computer readable program code having computer readable instructions which when implemented, cause a computer to carry out the steps of a method comprising:

receiving a graph;

partitioning said graph into at least one homogeneous block;

compressing said at least one homogeneous block;

storing said compressed at least one homogeneous block in at least one file;

wherein at least one of the steps is carried out using a computer device receiving a query;

forming at least one first query vector based on said query;

determining at least one relevant file which contains information needed to answer said query;

creating a first data submatrix by decompressing said at least one relevant file;

creating a first answer vector by executing generalized iterated matrix vector multiplication between said first data submatrix and said at least one first query vector;

creating a second data submatrix using said first answer vector;

creating at least one second query vector using said first answer vector; and creating a second answer vector by executing generalized matrix vector multiplication on between said second data submatrix and said at least one second query vector.

* * * * *